June 19, 1956      T. B. JOHNSON      2,750,667
PORTABLE POWER-DRIVEN CUTTING TOOL
Filed Oct. 11, 1952      2 Sheets-Sheet 1
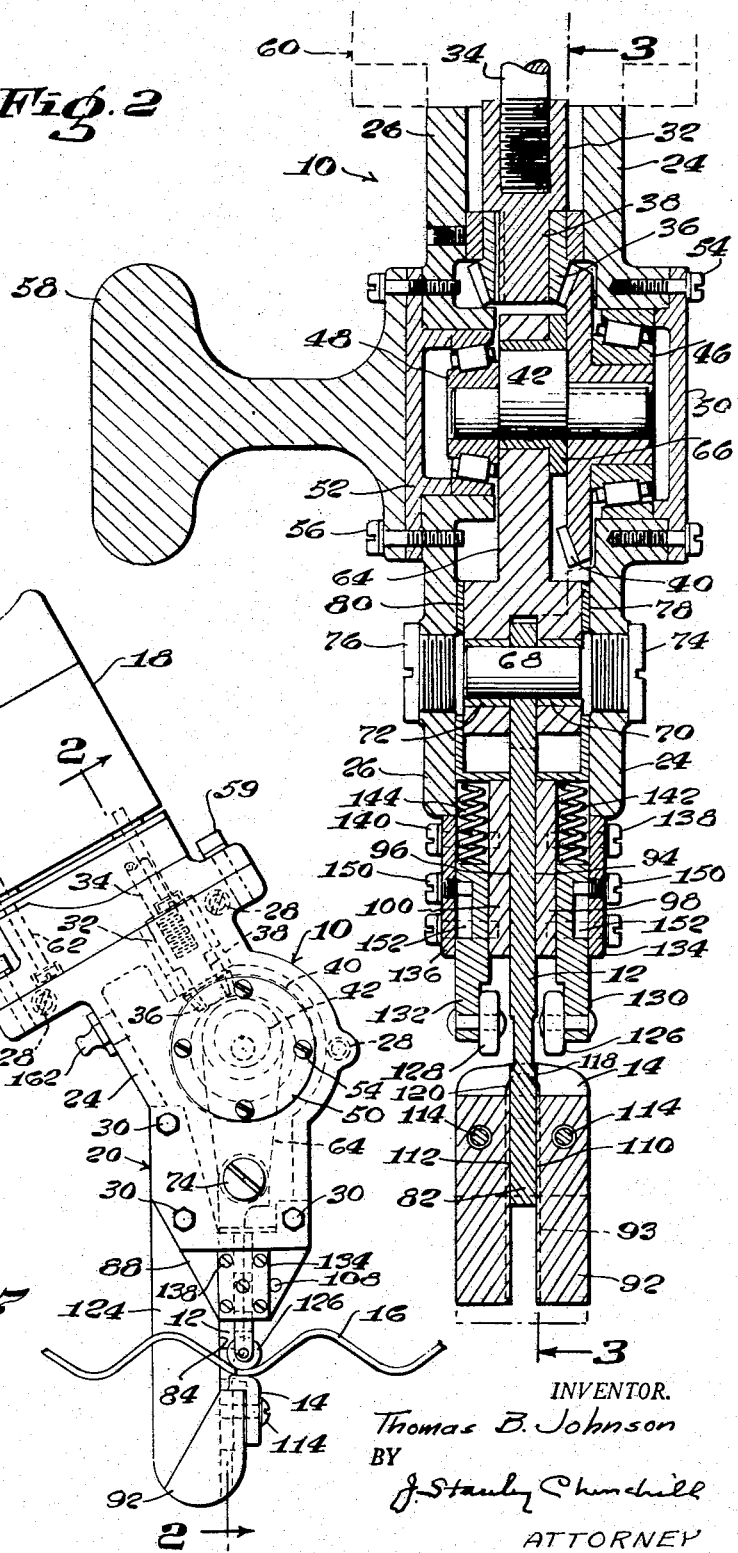
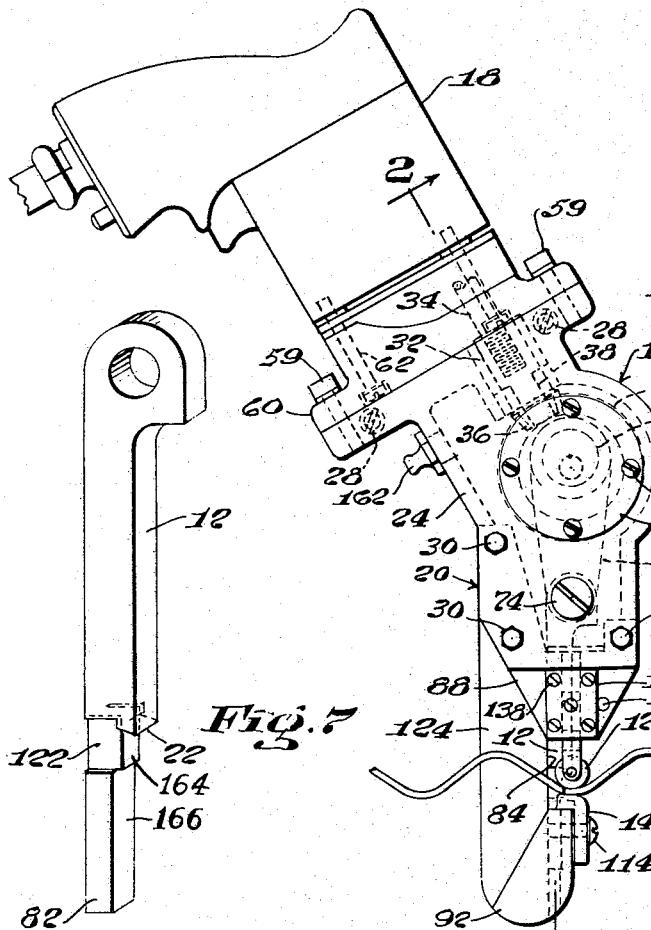
INVENTOR.
Thomas B. Johnson
BY
J. Stanley Churchill
ATTORNEY

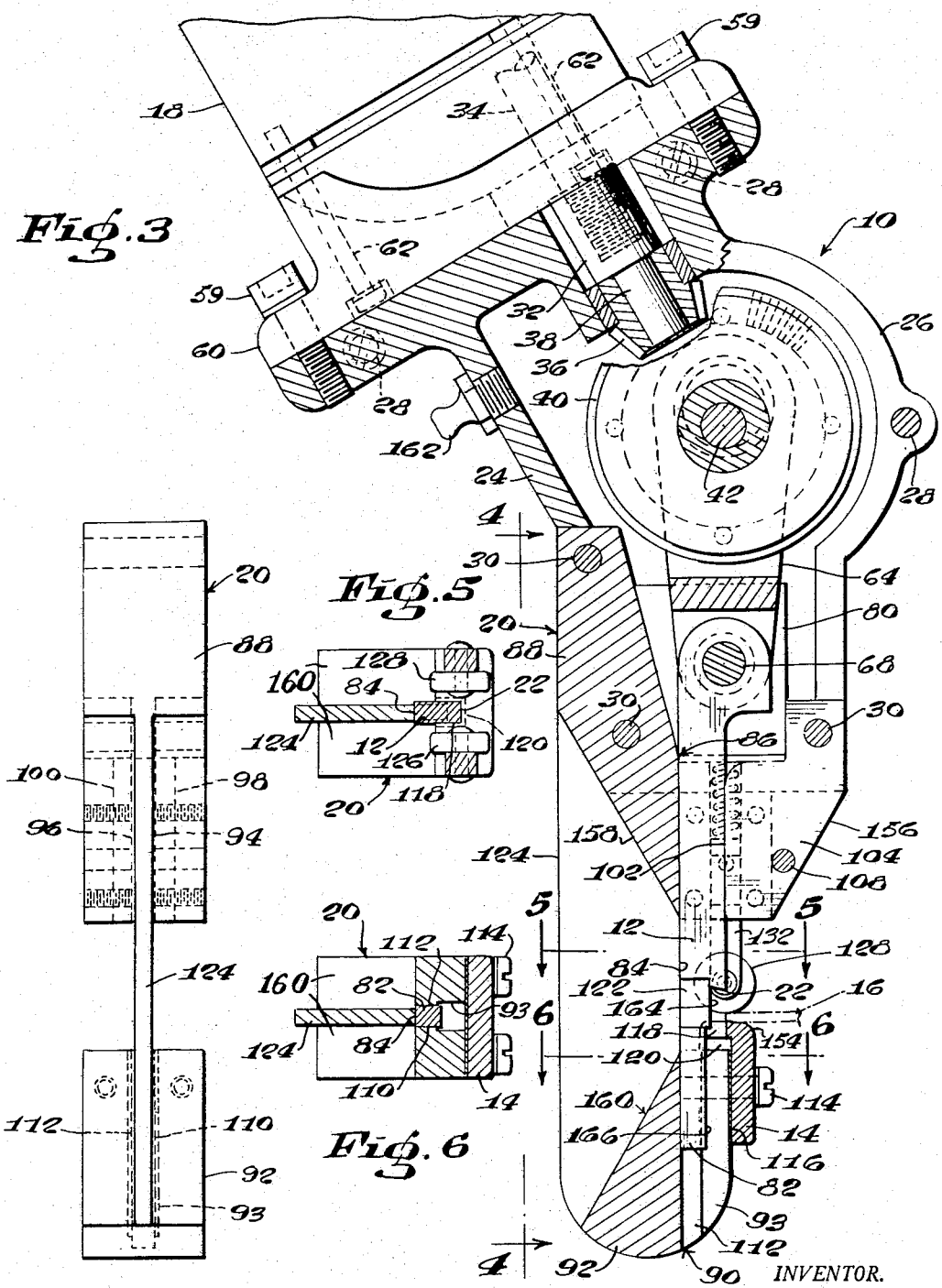

United States Patent Office 2,750,667
Patented June 19, 1956

2,750,667

PORTABLE POWER-DRIVEN CUTTING TOOL

Thomas B. Johnson, Ambridge, Pa., assignor to H. H. Robertson Company, Pittsburgh, Pa., a corporation of Pennsylvania Application October 11, 1952, Serial No. 314,305

2 Claims. (Cl. 30—228)

This invention relates to a cutting tool for cutting sheet metal.

The invention has for a principal object to provide a novel and improved portable, power-driven cutting tool particularly adapted for use in cutting corrugated or other irregularly shaped metal sheets and which is characterized by novel structure for rigidly supporting the reciprocating punch and for maintaining the sheet being cut in operative position relative to the cutting member as the tool is advanced along the sheet to perform the cutting operation in a superior, efficient and economical manner.

With this general object in view, and such others as may hereinafter appear, the invention consists in the cutting tool hereinafter described and particularly defined in the claims at the end of this specification.

In the accompanying drawings illustrating the preferred embodiment of the present invention:

Fig. 1 is a side elevation of the cutting tool;

Fig. 2 is a cross-sectional view taken on line 2—2 of Fig. 1;

Fig. 3 is a cross-sectional view taken on line 3—3 of Fig. 2;

Fig. 4 is a rear view of the punch-supporting block as seen from the line 4—4 of Fig. 3;

Fig. 5 is a cross-sectional view taken on line 5—5 of Fig. 3 showing the spring-pressed rollers;

Fig. 6 is a cross-sectional view taken on line 6—6 of Fig. 3 showing the detachable female die member; and Fig. 7 is a perspective view of the punch member.

In general, the present invention contemplates a novel construction of portable cutting tool particularly adapted to easily and rapidly shear sheet metal. The present tool is adapted to shear either flat or irregularly shaped metal sheets, and more particularly corrugated metal sheets. The novel and improved construction enables the tool to be easily advanced over the ridges and hollows of the corrugated metal sheets used for roofing and siding in building structures and to shear the same very efficiently. The present cutting tool embodies a movable-punch type cutter and a stationary die cutter arranged to perform a shearing operation commonly referred to as nibbling. Provision is made for supporting the movable punch in a novel manner whereby to enable an efficient shearing operation to be performed. Provision is further made for gripping and holding the metal sheet in proper cutting position during the cutting operation.

Referring now to the drawings, the illustrated cutting tool comprises in general a frame assembly, indicated generally at 10, for supporting a reciprocating punch member 12 and a female die member 14 supported in the lower portion of the frame 10 adapted to cooperate with the punch member 12 to cut a metal sheet 16 fed into the cutting portion of the tool. The frame assembly 10 is arranged for attachment to a portable electric drill 18 or other portable electric tool to supply the power necessary to operate the cutting tool.

The reciprocating punch member 12 is adapted to be reciprocated in a groove formed in a punch-supporting block 20 forming a part of the frame assembly 10, and as herein shown, the punch member 12 is provided with a cutting edge 22 intermediate its ends arranged to cooperate with the cutting edges of the female die member 14 detachably secured to the lower portion of the punch block 20.

As herein illustrated, the frame assembly 10 includes a housing bracket 24 and a cover plate 26 connected together by bolts 28 and enclosing the driving mechanism for the punch, and the punch-supporting block 20 is supported between portions of the housing bracket 24 and cover plate 26 and connected thereto by bolts 30. The punch member is arranged to be reciprocated in the punch-supporting block 20 through connections from the electric-drill motor 18 including an adapter 32 detachably secured to the spindle 34 of the motor. A pinion 36 fast on the adapter shaft 38 is arranged to mesh with a bevel gear 40 fast on one end of an eccentric 42 rotatably supported in bearings 46, 48 which in turn are supported in the frame assembly 10 and retained therein by bearing caps 50, 52 respectively secured to the frame by bolts 54, 56. A handle member 58 is secured to the bearing cap 52, as shown in Fig. 2, for convenience in handling the tool. The housing bracket 24 is connected by bolts 59 to an adapter bracket 60 arranged to fit over the head of the electric-drill frame and which in turn is secured to the drill frame by screws 62.

The punch member 12 is connected to the eccentric 42 by a link 64, the upper end of the link having a bushing 66 and the lower end of the link being formed as a yoke to which the punch is connected by a pin 68. Bearing bushings 70, 72 are provided in the yoke portion for the pin 68, and in order that the punch may be easily disconnected from the yoke for resharpening or replacement, screw caps 74, 76 are provided in opposite sides of the frame in alignment with the pin 68 when the eccentric is in its upstroke position, as shown in Fig. 2. The inner surfaces of the frame members 24, 26 are provided with friction plates 78, 80 between which the yoke end of the link 64 is arranged to slide during the operation of the tool.

As best shown in Fig. 7, the punch member 12 is elongated and provided with a cutting edge 22 intermediate its ends, the lower end 82 of the punch extending a substantial distance below the cutting edge. The punch 12 is arranged to be reciprocated in a grooved portion of the punch-supporting block 20, the groove having a continuous rear wall 84 extending from a point 86 in the upper portion 88 of the block to a point 90 in the lower portion 92 of the block. The groove in the upper portion 88 of the block is provided with the side walls 94, 96 formed between spaced, forwardly extended portions 98, 100 of the block, and a front wall 102 formed by a filler or spacer 104 inserted between the forwardly extended portions and secured thereto by one of the bolts 30 and dowel pin 108 extended therethrough. The groove in the lower portion 92 of the block is also provided with side walls 110, 112 coextensive with the side walls 94, 96 respectively in the upper portion.

The die 14 is secured to the lower portion 92 of the block by screws 114, a thin metal shim 116 being provided as required to obtain the proper clearance between the punch and the die. The die opening 118 is provided with front and side cutting edges for cooperation with the front and side cutting edges 22 of the punch 12, as illustrated in Figs. 2 and 5, and a clearance 120 is provided in the underside of the die. As shown in Figs. 2 and 6, the groove in the lower portion 92 of the block is widened, as indicated at 93, in the area immediately below the die to provide clearance for the chips cut from the work during the operation of the tool. It will also be observed that the portion of the punch immediately behind and below the cutting edge 22 is reduced in width, as indicated at 122, to provide clearance for the work as it is cut.

The intermediate portion of the block 20 adjacent the cutting area comprises a relatively thin web 124 of less thickness than the width of the cut made by the tool so that this portion of the tool may pass through the slot made by the cutter as it is advanced along the work to perform the cutting operation.

Provision is also made for yieldingly holding the work down against the upper face of the die during the cutting operation, and as herein shown, a pair of rollers 126, 128 are provided, one on each side of the punch to engage the work. The rollers are carried by arms 130, 132 mounted in grooves formed in the sides of the forwardly extended portions 98, 100 of the punch-supporting block, the arms being retained in the grooves by gib plates 134, 136 secured to the portions 98, 100 by screws 138, 140. The upper portions of the roller-arm grooves are provided with springs 142, 144 interposed between the undersides of the friction plates 78, 80 and the tops of the roll-carrying arms 130, 132 respectively, as illustrated. Stop studs 150 carried by the gib plates 134, 136 are arranged to extend into cutout portions 152 of the arms in order to limit the sliding movement of the arms and to retain the arms in the grooves.

It will also be observed that adequate angular clearance is provided at the front and rear portions of the tool adjacent the cutting area to permit the tool to be rocked as it is moved up and down over the corrugations of the sheet being cut. Thus, the front edge of the die is rounded, as indicated at 154, and the front portion of the frame member is formed at an angle, as indicated at 156. Also, the relatively thin web portion 124, formed by cutting away equal portions from opposite sides of the block 20, is formed at a relatively wide angle, as indicated at surfaces 158, 160, to provide the angular clearance at the back of the tool. This construction enables the operator to rock the tool as it is advanced up and down the ridges and hollows of a corrugated metal sheet to maintain the cutting members of the tool at right angles to the portion of the sheet being cut. The tool may be provided with a conventional grease fitting 162 in one side of the housing for lubricating the driving mechanism.

From the above description it will be observed that the present structure provides a lightweight, simply constructed, portable cutting tool which is particularly adapted to cut corrugated or other irregularly shaped metal sheets in an efficient and superior manner. In practice, the frame members 24, 26 and 60 may comprise a lightweight metal, such as aluminum, and the punch-supporting block 20 and the punch and die may and preferably will comprise hardened tool steel.

In the operation of the present tool, the extension of the punch body a substantial distance beyond the cutting edges and the provisions of a continuous backing support for the punch between the points 86 and 90 in the block 20 provides a relatively rigid structure enabling the tool to cut a relatively heavy-gauge sheet metal in an efficient manner. In operation, the tool is placed at the edge of the sheet to be cut with the edge of said sheet bearing against the cut-back surface 164 of the punch immediately below the cutting edge 22, such surface determining the extent of successive cuts made by the tool as it is advanced along the sheet. The extended portion 82 of the punch is preferably further cut back beyond the surface 164, as indicated at 166, to provide clearance for the chips cut from the sheet. It will also be observd that the yieldingly mounted rollers 126, 128 for holding the work down against the die also reduces friction so as to enable the tool to be easily moved forward along the work during the cutting operation. It will be further observed that the present structure enables the tool to be readily disassembled for cleaning and repair purposes.

While the preferred embodiment of the invention has been herein illustrated and described, it will be understood that the invention may be embodied in other forms within the scope of the following claims.

Having thus described the invention, what is claimed is:

1. A portable power-driven tool for cutting metal sheets comprising a supporting member having upper and lower relatively thick, spaced portions and having cutaway surfaces forming a relatively thin, connecting web portion, said upper and lower portions having aligned grooves each provided with a rear wall and side walls, the front face of said connecting web portion being coextensive with the rear walls of said aligned grooves, an elongated punch having front and side cutting edges intermediate its length and mounted for reciprocation in said grooves and arranged to perform the cutting operation on its downward stroke, a die having front and side cutting edges mounted on the upper face of said lower portion of said supporting member for cooperation with the corresponding cutting edges of the punch, the groove in said lower portion extending downwardly beyond the cutting edges of said die whereby to form a continuous rigid support for the rear face of said punch in said lower portion and to provide lateral support for the punch in said lower portion.

2. A portable power-driven tool for cutting metal sheets comprising a supporting member having upper and lower relatively thick, spaced portions and having cutaway surfaces forming a relatively thin, connecting web portion, said upper and lower portions having aligned grooves each provided with a rear wall and side walls, the front face of said connecting web portion being coextensive with the rear walls of said aligned grooves, an elongated punch having front and side cutting edges intermediate its length and mounted for reciprocation in said grooves and arranged to perform the cutting operation on its downward stroke, a die having front and side cutting edges mounted on the upper face of said lower portion of said supporting member for cooperation with the corresponding cutting edges of the punch, the groove in said lower portion extending downwardly beyond the cutting edges of said die whereby to form a continuous rigid support for the rear face of said punch in said lower portion and to provide lateral support for the punch in said lower portion, said relatively thin portion being of a thickness less than the effective width of the punch to permit the tool to pass through the opening cut in the sheet, said relatively thin portion being extended rearwardly and angularly through said upper and lower portions substantially radially from said cutting area, and said upper portion being cut away forwardly and angularly substantially radially from the cutting area such as to provide angular clearance to permit rocking of the tool up and down the corrugations of a corrugated sheet during the cutting operation, said die being rounded at its forward edge to provide further clearance for said rocking movement.

References Cited in the file of this patent

UNITED STATES PATENTS

| | | |
|---|---|---|
| 703,036 | Baird | June 24, 1902 |
| 824,480 | Hastings | June 26, 1906 |
| 2,201,599 | Trautmann | May 21, 1940 |
| 2,217,923 | Silverman | Oct. 15, 1940 |
| 2,272,295 | Forss | Feb. 10, 1942 |
| 2,278,174 | Gray | Mar. 31, 1942 |
| 2,535,631 | Gray | Dec. 26, 1950 |
| 2,632,950 | Hedstrom | Mar. 31, 1953 |